United States Patent
Kosuge et al.

(10) Patent No.: US 9,880,435 B2
(45) Date of Patent: Jan. 30, 2018

(54) DISPLAY DEVICE

(71) Applicant: Japan Display Inc., Minato-ku (JP)

(72) Inventors: Masahiro Kosuge, Minato-ku (JP); Kenji Nakao, Minato-ku (JP); Osamu Itou, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 114 days.

(21) Appl. No.: 15/086,740

(22) Filed: Mar. 31, 2016

(65) Prior Publication Data

US 2016/0299395 A1 Oct. 13, 2016

(30) Foreign Application Priority Data

Apr. 7, 2015 (JP) .................................. 2015-078788

(51) Int. Cl.
*G02F 1/1362* (2006.01)

(52) U.S. Cl.
CPC .. *G02F 1/136209* (2013.01); *G02F 1/136286* (2013.01); *G02F 2001/136222* (2013.01)

(58) Field of Classification Search
CPC ......... G02F 1/136209; G02F 1/136286; G02F 1/136213; G02F 1/133753; G02F 1/134363; G02F 1/13394
USPC ........................................................ 345/174
See application file for complete search history.

(56) References Cited

U.S. PATENT DOCUMENTS

| | | | |
|---|---|---|---|
| 4,802,743 A | 2/1989 | Takao et al. | |
| 5,943,107 A * | 8/1999 | Kadota | G02F 1/133514 349/106 |
| 6,255,131 B1 * | 7/2001 | Mori | G02F 1/136213 257/E21.412 |
| 9,274,391 B2 * | 3/2016 | Matsumura | G02F 1/136209 |
| 2002/0101557 A1 * | 8/2002 | Ono | G02F 1/134363 349/143 |
| 2004/0135939 A1 * | 7/2004 | Luo | G02F 1/136209 349/110 |
| 2004/0227891 A1 * | 11/2004 | Hirota | G02F 1/133753 349/141 |
| 2005/0152230 A1 * | 7/2005 | Konno | G02F 1/134363 369/1 |
| 2005/0190315 A1 * | 9/2005 | Asuma | G02F 1/136209 349/44 |
| 2013/0009176 A1 * | 1/2013 | Kang | G02F 1/13394 257/88 |
| 2014/0098315 A1 * | 4/2014 | Jung | G02F 1/136209 349/42 |

(Continued)

FOREIGN PATENT DOCUMENTS

| | | |
|---|---|---|
| JP | 5-100112 | 4/1993 |
| JP | 2002-357828 | 12/2002 |
| JP | 2011-227524 | 11/2011 |

*Primary Examiner* — Fred Tzeng
(74) *Attorney, Agent, or Firm* — Oblon, McClelland, Maier & Neustadt, L.L.P.

(57) ABSTRACT

A display device includes a first light shielding part provided between a filter film and a first electrode, and a second light shielding part provided on a second substrate. First and second filter films each have long sides that extend in a first direction in which a video signal line extends, and the first and the second filter films are arranged adjacent to each other in a second direction different from the first direction. The first light shielding part overlaps the video signal line in a plan view. The second light shielding part overlaps a metal electrode in the plan view.

20 Claims, 16 Drawing Sheets

(56) References Cited

U.S. PATENT DOCUMENTS

| | | | | |
|---|---|---|---|---|
| 2014/0293182 A1* | 10/2014 | Kim | ................ | G02F 1/136209 |
| | | | | 349/43 |
| 2016/0018708 A1* | 1/2016 | Kanda | ............... | G02F 1/136209 |
| | | | | 257/254 |
| 2016/0178950 A1* | 6/2016 | Kwak | ................ | G02F 1/13394 |
| | | | | 257/72 |

* cited by examiner

DISPLAY DEVICE

CROSS-REFERENCE TO RELATED APPLICATIONS

This application claims priority from Japanese Application No. 2015-078788, filed on Apr. 7, 2015, the contents of which are incorporated by reference herein in its entirety.

BACKGROUND

1. Technical Field

The present invention relates to a display device that displays an image.

2. Description of the Related Art

Japanese Patent Application Laid-open Publication No. 2011-227524 (JP-A-2011-227524) discloses a display device that has what is called a color-filter-on-array (COA) structure in which a color filter is disposed on an array substrate that includes switching elements.

A light shielding film disclosed in JP-A-2011-227524 is formed so as to integrally cover both video signal lines and the switching elements adjacent to the respective video signal lines. However, the light shielding film disclosed in JP-A-2011-227524 does not cover metal electrodes provided in contact holes for coupling the switching elements to pixel electrodes. For the foregoing reasons, there is a need for reducing influences of reflected light from the metal electrodes.

SUMMARY

According to an aspect, a display device includes: a first substrate including a switching element; and a second substrate provided at a position facing the first substrate. The first substrate includes: a scanning line that drives the switching element; a video signal line electrically coupled to the switching element; a first electrode electrically coupled to the switching element via a metal electrode; a filter film including a first filter film and a second filter film that has a visible-light wavelength distribution different from that of the first filter film; a first light shielding part provided between the filter film and the first electrode; and a second light shielding part provided on the second substrate. The first filter film and the second filter film each have long sides that extend in a first direction in which the video signal line extends, and the first filter film and the second filter film are arranged adjacent to each other in a second direction different from the first direction. The first light shielding part overlaps the video signal line in a plan view. The second light shielding part overlaps the metal electrode in the plan view.

DETAILED DESCRIPTION

Figure 1:
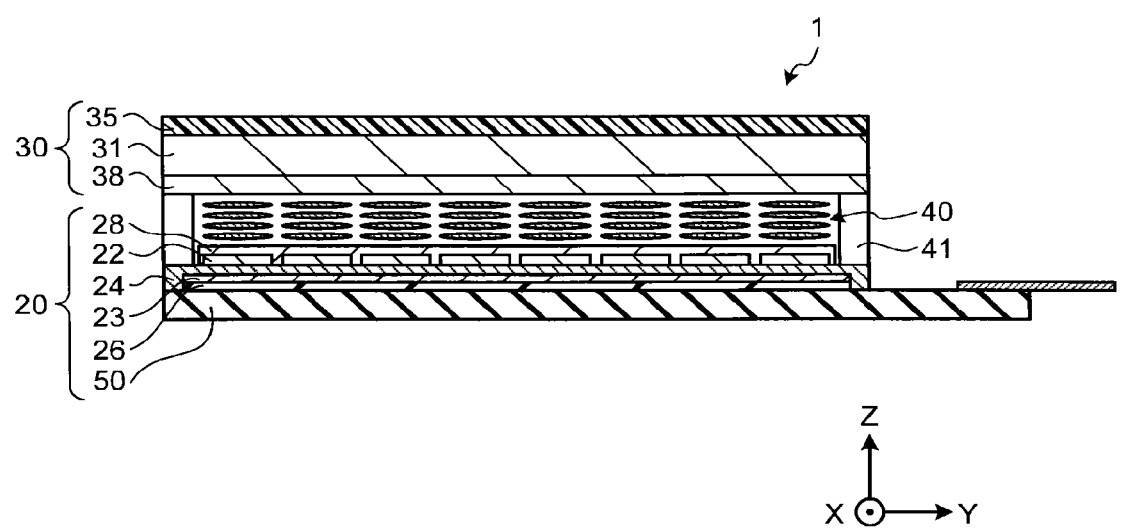
FIG. 1 is a sectional view illustrating a schematic section of a display device according to a first embodiment of the present invention.

The following describes details of embodiments for carrying out the present invention with reference to the drawings. The present invention is not limited to the embodiments described below. Components described below include a component that is easily conceivable by those skilled in the art and substantially the same component. The disclosure is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings as compared with an actual aspect. However, this is merely an example, and interpretation of the invention is not limited thereto. The same elements as those described in the drawing that have already been discussed are denoted by the same reference numerals throughout the description and the drawings, and detailed description thereof will not be repeated in some cases where appropriate.

First Embodiment

FIG. 1 is a sectional view illustrating a schematic sectional structure of a display device according to a first embodiment of the present invention. As illustrated in FIG. 1, this display device 1 includes an array substrate 20, a counter substrate 30 disposed so as to face the array substrate 20, and a liquid crystal layer 40 interposed between the array substrate 20 and the counter substrate 30. In the following description, positional relations of various components will be described with reference to an XYZ orthogonal coordinate system in some cases. The X-axis direction as a direction in a horizontal plane is referred to as a width direction or a second direction; the Y-axis direction as a direction orthogonal to the X-axis direction in the horizontal plane referred to as a longitudinal direction or a first direction; and the Z-axis direction orthogonal to both the X-axis and Y-axis directions is referred to as a vertical direction. The upward direction of the vertical direction with respect to a first substrate 50 refers to a direction from the first substrate 50 toward the counter substrate 30.

The array substrate 20 includes filter films 26 provided above the first substrate 50, a second electrode 23 provided above the filter films 26, an insulating film 24 disposed on top of the second electrode 23 so as to be in contact therewith, first electrodes 22 on top of the insulating film 24, and a first alignment film 28 disposed on the top surface side of the array substrate 20.

The counter substrate 30 includes a second substrate 31, a second alignment film 38 disposed on the lower surface of the second substrate 31, and a polarizing plate 35 disposed on the upper surface of the second substrate 31.

The array substrate 20 is fixed to the counter substrate 30 via a sealing part 41. The liquid crystal layer 40 is sealed in a space surrounded by the array substrate 20, the counter substrate 30, and the sealing part 41. The liquid crystal layer 40 contains liquid crystal molecules that change in alignment direction according to an electric field applied thereto.

The liquid crystal layer 40 modulates light passing through the inside of the liquid crystal layer 40 according to the state of the electric field. The direction of the liquid crystal molecules of the liquid crystal layer 40 is changed according to the electric field applied between the first electrodes 22 and the second electrode, and thus, the amount of transmission of the light passing through the liquid crystal layer 40 is changed accordingly.

Figure 2:
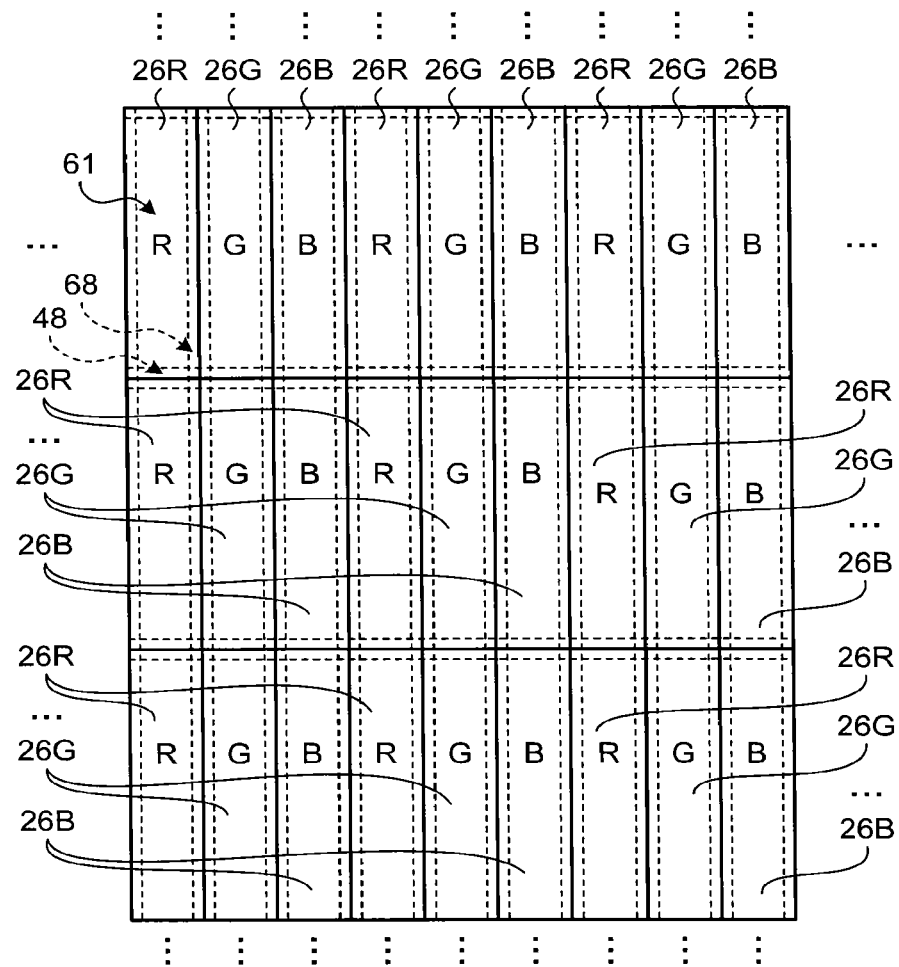
FIG. 2 is a diagram illustrating an array of sub-pixels of the display device illustrated in FIG. 1.

FIG. 2 is a diagram illustrating an array of sub-pixels of the display device illustrated in FIG. 1. As illustrated in FIG. 2, sub-pixels 61 are arranged in a matrix in the plan view when viewing the display device 1 from the above.

One pixel serving as a unit for forming a color image contains, for example, a plurality of sub-pixels 61. One pixel contains adjacent sub-pixels of a sub-pixel 61 for displaying red (R), another sub-pixel 61 for displaying blue (B), and still another sub-pixel 61 for displaying green (G). Each of the filter films 26 having corresponding one of these colors is arranged for the sub-pixel 61 for displaying the color.

The filter films 26 are also called color filters, and are constituted by filter films 26R (first filter films), filter films 26G (second filter films), and filter films 26B (third filter films), each having a visible-light wavelength distribution different from one another. Each of the filter films 26R is a resin material colored so as to transmit a visible-light wavelength distribution of red (R). Each of the filter films 26G is a resin material colored so as to transmit a visible-light wavelength distribution of green (G). Each of the filter films 26B is a resin material colored so as to transmit a visible-light wavelength distribution of blue (B). The visible-light wavelength distributions described above are not limited to those of red (R), green (G), and blue (B), but may be those of white, cyan, magenta, and yellow.

Each of the filter films 26R, 26G, and 26B has long sides in the first direction, and is cyclically arranged in the second direction. The filter films 26 of each color are provided so as to have substantially the same intensity of visible light transmitted therethrough, throughout the plane. For example, the filter films 26R and 26G are arranged so as to have substantially the same intensity of visible light transmitted through the filter films 26R and 26G, respectively, throughout the plane. The filter films 26R are arranged adjacent to the filter films 26G in the second direction different from the first direction. The filter films 26R, 26G, and 26B having three different visible-light wavelength distributions are exemplified as the filter films 26, but filter films that have four or more different visible-light wavelength distributions may be cyclically arranged column by column.

As illustrated in FIG. 2, first light shielding parts 68 are arranged so as to extend in the first direction along boundaries among the filter films 26R, 26G, and 26B, and second light shielding parts 48 are arranged so as to extend in the second direction along boundaries between the sub-pixels 61. The material of the first light shielding parts 68 is not limited, as long as being black in color, and examples thereof include metal materials such as chromium oxides, and resin materials such as carbon black.

Figure 3:
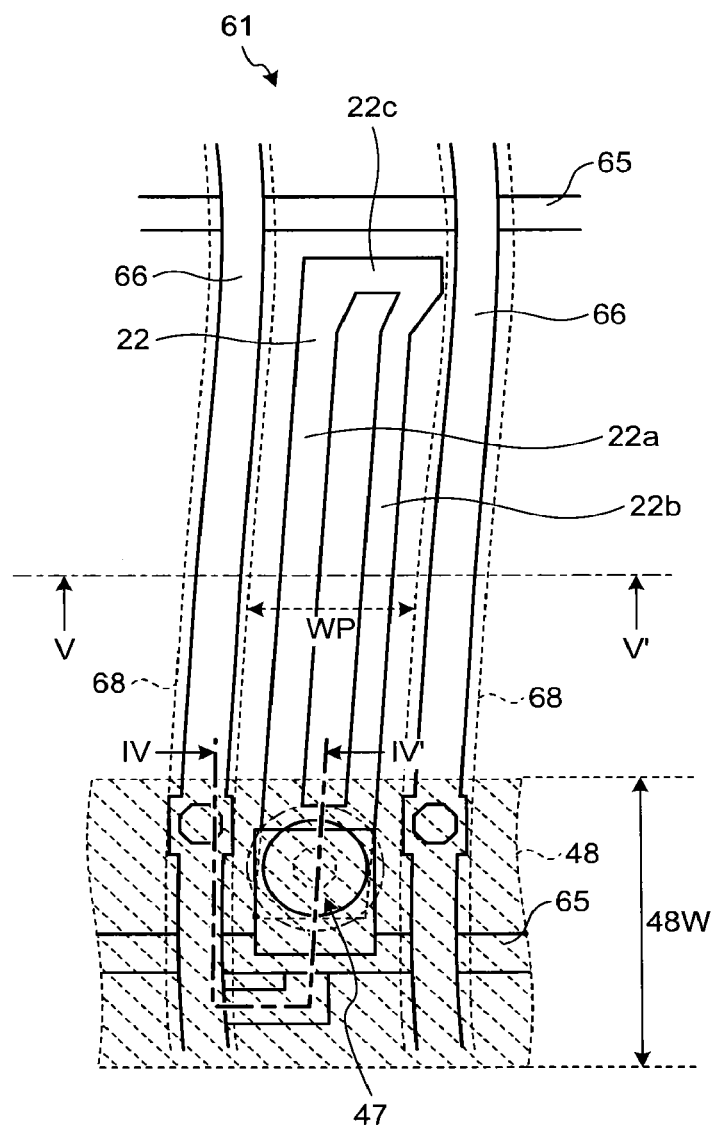
FIG. 3 is a plan view illustrating a schematic planar structure of each of the sub-pixels illustrated in FIG. 2.
Figure 4:
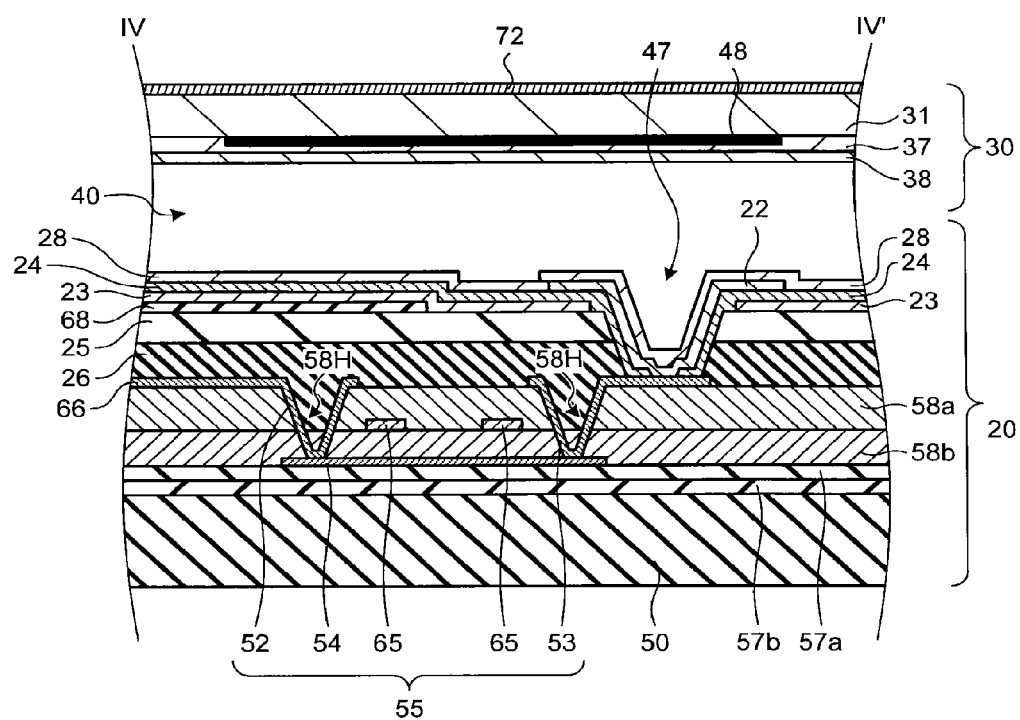
FIG. 4 is a sectional view schematically illustrating a cross-section taken along line IV-IV' in FIG. 3.
Figure 5:
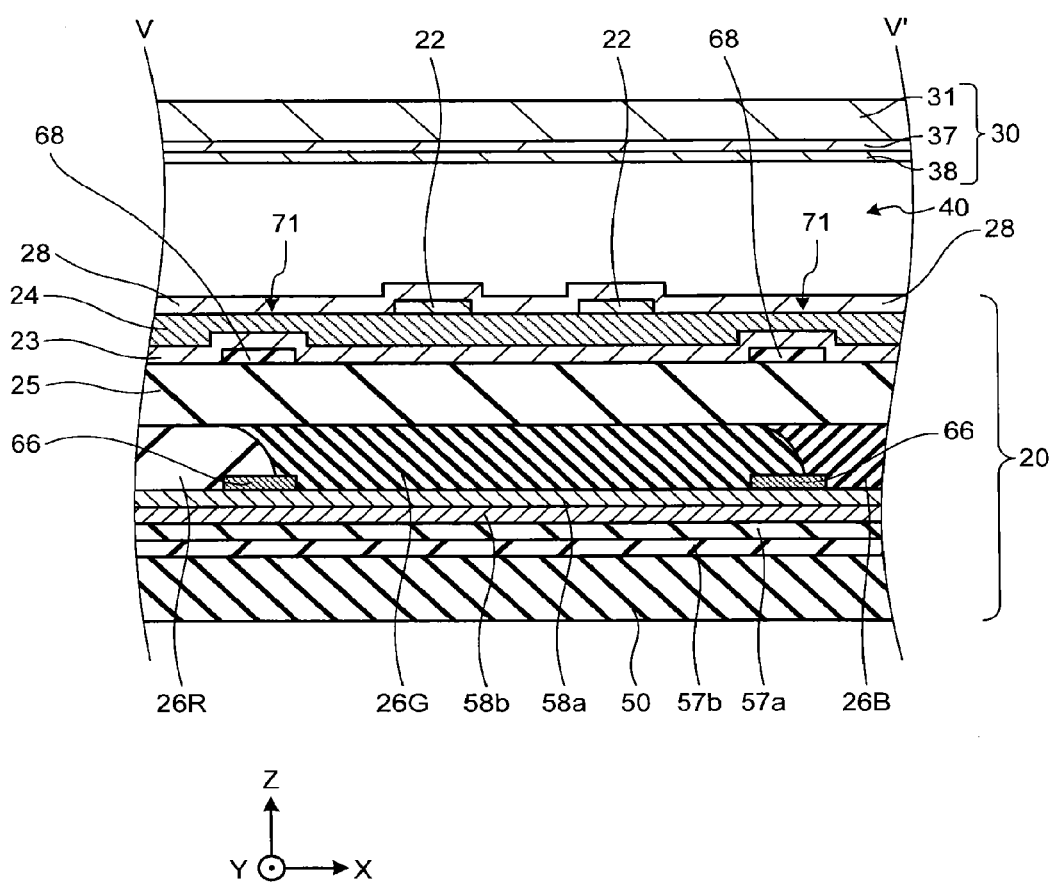
FIG. 5 is a sectional view schematically illustrating a cross-section taken along line V-V' in FIG. 3.

FIG. 3 is a plan view illustrating a schematic planar structure of each of the sub-pixels illustrated in FIG. 2. FIG. 4 is a sectional view schematically illustrating a cross-section taken along line IV-IV' in FIG. 3. FIG. 5 is a sectional view schematically illustrating a cross-section taken along line V-V' in FIG. 3.

As illustrated in FIG. 3, each of the sub-pixels 61 is a region surrounded by adjacent scanning lines 65 and adjacent video signal lines 66. Each of the first electrodes 22 is surrounded by the adjacent scanning lines 65 and the adjacent video signal lines 66 in the plan view.

The first electrode 22 includes a plurality of electrode branches 22*a* and 22*b* extending in the first direction. A connecting portion 22*c* couples an end of the electrode branch 22*a* to an end of the electrode branch 22*b*. The first electrode 22 may have a bar shape or a linear shape extending in one direction without having any electrode branch. In this case, the sub-pixels 61 can be increased in resolution. The first electrode 22 may alternatively have three or more electrode branches.

For example, a translucent conductive material, such as indium tin oxide (ITO) and zinc oxide (ZnO), is used for the first electrode 22. For example, a translucent conductive material, such as ITO and ZnO, is used for the second electrode 23.

As illustrated in FIG. 4, each of the scanning lines 65 for transmitting a driving signal to a switching element 55 extends. An on-off operation of the switching element 55 illustrated in FIG. 4 can be controlled according to a driving voltage transmitted through the scanning line 65. The video signal lines 66 for transmitting video signals to the first electrodes 22 extend in a direction intersecting the scanning lines 65.

In FIG. 3, the video signal lines 66 extend in the first direction described above, and the scanning lines 65 extend in the second direction described above. The video signal lines 66 extend as a whole in a direction intersecting the scanning lines 65 in the plan view, and may intersect the scanning lines 65 at oblique angles on a pixel-by-pixel basis. In this manner, the first direction only needs to be roughly along the video signal lines 66, and need not be perfectly parallel thereto. The second direction only needs to be roughly along the scanning lines 65, and need not be perfectly parallel thereto.

Each of the video signal lines 66 is electrically coupled to a source electrode 52 illustrated in FIG. 4, and each of the video signals is transmitted to the first electrode 22 when the switching element 55 is in the on-state. Electrical coupling of the switching element 55 and each of the video signal lines 66 includes electrical coupling via, for example, a capacitor, a resistor, and a memory interposed therebetween.

The second electrode 23 illustrated in FIGS. 4 and 5 is what is called a common electrode to which a common potential is applied. The second electrode 23 is provided so as to face the first electrodes 22. As described above, a potential corresponding to the video signal is applied to the first electrode 22 via the switching element 55 electrically coupled thereto. This operation changes the potential between the first electrode 22 and the second electrode 23, thereby changing the electric field applied to the liquid crystal layer 40.

As illustrated in FIG. 4, the array substrate 20 includes the switching elements 55, the first electrodes 22, the second electrode 23, and the filter films 26. The counter substrate 30 includes the second alignment film 38 facing the array substrate 20. The second alignment film 38 is disposed on the second substrate 31 with a planarization layer 37 interposed therebetween.

The array substrate 20 is provided with the switching elements 55 on top of the first substrate 50. Each of the switching elements 55 includes a semiconductor layer 54, the scanning line (gate electrode) 65, the source electrode 52, and a drain electrode 53. The first substrate 50 is a supporting substrate, such as a glass substrate or a silicon substrate. The first substrate 50 is provided with the semiconductor layer 54 with insulating layers 57a and 57b interposed therebetween.

A semiconductor material, such as silicon, an oxide semiconductor material, or a compound semiconductor material, is used for the semiconductor layer 54. The source electrode 52 and the drain electrode and 53 are coupled to the semiconductor layer 54 through first coupling holes 58H (called contact holes) of insulating layers 58a and 58b, and are coupled to the video signal lines 66 on top of the insulating layer 58a. The scanning lines 65 are provided between the insulating layers 58a and 58b, and are isolated from the semiconductor layer 54. The source electrode 52 and the drain electrode 53 are electrodes made of a metal material, such as aluminum or molybdenum. A metal material such as aluminum or molybdenum is used for the scanning lines 65.

A tetra-ethyl-ortho-silicate (TEOS) film or a plasma silicon nitride (PSiN) film is used as each of the insulating layers 57a, 57b, 58a, and 58b. In the present embodiment, the switching element 55 is, for example, an re-channel metal oxide semiconductor (MOS) thin-film transistor.

The switching element 55 may be a p-channel MOS thin-film transistor. The switching element 55 may be a drive circuit having a static random access memory (SRAM) in a pixel. The drive circuit can realize both a direct display mode of performing a display operation according to pixel signals transmitted through the video signal lines and a memory display mode. The direct display mode is a mode of displaying gradations of pixels in an analog manner according to the pixel signals. The memory display mode is a mode of displaying gradations of pixels in a digital manner based on binary information (logical "1" or logical "0") stored in the memory of the pixel. Less power is consumed in the memory display mode than in the direct display mode. This results in reduction in the power consumption of the display device 1.

As illustrated in FIG. 4, the filter films 26 are disposed on top of the switching elements 55. The display device 1 of the present embodiment is a liquid crystal display device having what is called a COA structure in which the filter films 26 are disposed on the array substrate 20 side.

An overcoat layer 25 made of, for example, a translucent resin such as an acrylic resin is disposed on top of the filter films 26. The second electrode 23, the insulating film 24, and the first electrodes 22 are provided in this order on the overcoat layer 25. An insulating material such as silicon nitride (SiN) is used for the insulating film 24. The second electrode 23 is continuously disposed on top of the overcoat layer 25. The first electrodes 22 are provided in a layer different from the second electrode 23 with the insulating film 24 interposed between the first electrodes 22 and the second electrode 23. As illustrated in FIG. 4, the overcoat layer 25 and the filter films 26 have second coupling holes 47 (called contact holes) penetrating upper and lower surfaces thereof. Each of the first electrodes 22 is formed also on the inside of corresponding one of the second coupling holes 47, and is electrically coupled to the drain electrode 53 provided at the bottom of the second coupling hole 47.

The first alignment film 28 is provided above the first electrodes 22 and the insulating film 24. An alignment treatment using, for example, a roller or ultraviolet rays has been performed on the first alignment film 28 to provide anisotropy thereto. Examples of the alignment treatment include, but are not limited to, a photo-alignment treatment for irradiating the first alignment film 28 with the ultraviolet rays and a rubbing alignment treatment for rubbing the first alignment film 28 with the roller or a cloth.

As illustrated in FIG. 4, the second substrate 31 has a flat surface facing the array substrate 20, and the second alignment film 38 is disposed on the flat surface of the second substrate 31 with the planarization layer 37 interposed therebetween. A glass substrate or a sheet-like insulating base material made of a translucent resin material can be used for the second substrate 31.

The alignment treatment has also been performed on the second alignment film 38 in the same manner as on the first alignment film 28. The above-described anisotropy of the first alignment film 28 and the second alignment film 38 causes the liquid crystal molecules of the liquid crystal layer 40 to be aligned in a certain direction.

As illustrated in FIGS. 3 and 4, the second light shielding parts 48 are formed on the second substrate 31. In the plane view of FIG. 3, the counter substrate 30 includes the second light shielding parts 48 formed so as to each overlap a region including the source electrode 52 and the drain electrode 53 serving as the metal electrodes of the first coupling holes 58H. Each of the second light shielding parts 48 also overlaps a region including the second coupling hole 47.

As illustrated in FIGS. 3 and 4, the second light shielding part 48 has a longitudinal length 48W overlapping a region including the first coupling holes 58H, the scanning lines 65, and the switching elements 55.

The material of the second light shielding parts 48 is not limited, as long as being black in color. For example, the material may be a resin material or a metal material, as long as the material can provide higher attenuation of light in the visible light region (with a wavelength from 380 nm to 780 nm) passing through the first light shielding parts 68 than that can be provided by any of the filter films 26R, 26B, and 26G. However, the second light shielding parts 48 overlap the scanning lines 65 and the switching elements 55, and thus, need not have as high a light shielding performance as that of the first light shielding parts 68 that serves also to prevent color mixture. Accordingly, the second light shielding parts 48 are preferably made of a resin material that is lower in cost and requires simpler production processes.

In recent years, there is a known technique in which a detection electrode 72 for detecting a contact or proximity of an object is formed on a surface of the second substrate 31 opposite to the surface thereof on which the second light shielding parts 48 are formed, as illustrated in FIG. 4. The object is, for example, a human body or a stylus, and can have any shape, as long as being a conductor. The detection electrode 72 as described above is made of a metal material or a translucent conductive material, and is directly formed on the second substrate 31. The detection electrode 72 is patterned as a plurality of conductive patterns in the plane of the second substrate 31. Therefore, if the second light shielding parts 48 are made of a metal material, capacitance may be generated between the detection electrode 72 and the second light shielding parts 48, and may cause an adverse effect on a detection operation of the detection electrode 72. In consideration of the above point, the second light shielding parts 48 are preferably made of a resin material. The detection operation of the detection electrode 72 may use either the self-capacitance method or the mutual capacitance method.

The second light shielding parts 48 overlap the scanning lines 65 in the plan view, and thus can reduce reflected light from the scanning lines 65. The second light shielding parts 48 overlap the switching elements 55 in the plan view, and thus can reduce leak currents of the switching elements 55. In addition to the second light shielding parts 48, third light shielding parts (not illustrated) may be provided between the first substrate 50 and the switching elements 55 so as to overlap the switching elements 55 in the plan view. The third light shielding parts can reduce leak currents caused by irradiation of the switching elements 55 with light.

The second light shielding parts 48 are formed on the second substrate 31, and thus can reduce reflection of light in the source electrode 52 and the drain electrode 53 serving as the metal electrodes.

As a comparative example, if the second light shielding parts 48 are provided to the first substrate 50, the second light shielding parts 48 are directly laminated on the first coupling holes 58H. In this case, the first coupling holes 58H may prevent the second light shielding parts 48 from maintaining a uniform film thickness, thus generating variation in the thickness at ends of the second light shielding parts 48. As a result, the variation in the thickness at ends of the second light shielding parts 48 of the comparative example may cause partial variation in the light shielding performance. To reduce the variation in the thickness at ends of the second light shielding parts 48, the film thickness needs to be increased. However, there is a limitation to increase the film thickness, and the increase of the film thickness may lead to a delay in the production process, thereby increasing the production cost.

On the other hand, the second light shielding parts 48 of the present embodiment can be easily formed as a film on the surface of the second substrate 31, so that the variation in the thickness at ends of the second light shielding parts 48 is reduced. As a result, the second light shielding parts 48 of the present embodiment can be higher in the light shielding performance and lower in the production cost. In this manner, the second light shielding parts 48 are not directly laminated on the first coupling holes 58H, and thus accuracy in film forming can be high.

As illustrated in FIG. 5, the first light shielding parts 68 are provided under the second electrode 23. As illustrated in FIG. 3, the first light shielding parts 68 are arranged in positions so as to overlap the video signal lines 66 in the plan view.

Figure 6:
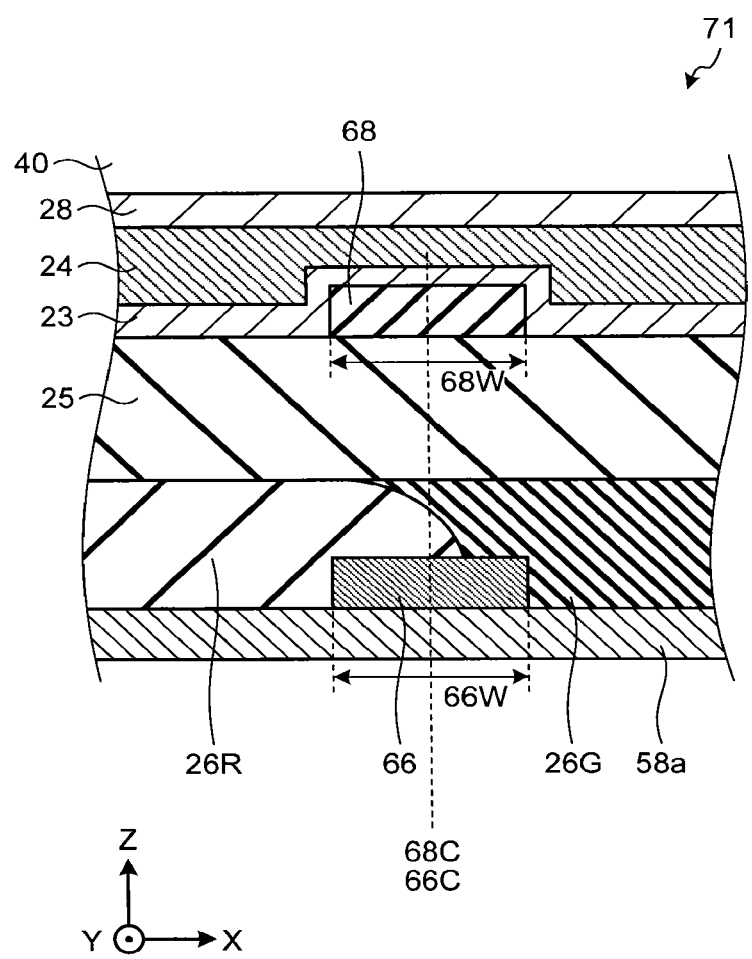
FIG. 6 is a sectional view obtained by partially enlarging a filter boundary part illustrated in FIG. 5.

FIG. 6 is a sectional view obtained by partially enlarging a filter boundary part illustrated in FIG. 5. As illustrated in FIG. 5, the vicinity of a boundary between the filter films 26R and 26G and the vicinity of a boundary between the filter films 26G and 26B are defined as filter boundary parts 71. Although not illustrated, a filter boundary part 71 also lies in the vicinity of a boundary between the filter films 26B and 26R. Hereinafter, the filter boundary part 71 is described by using an example of the vicinity of the boundary between the filter films 26R and 26G. The vicinities of the boundaries between the filter films 26G and 26B and between the filter films 26B and 26R have the same configuration, and accordingly, will not be described.

As illustrated in FIG. 6, each of the first light shielding parts 68 of the first embodiment is formed on the upper surface of the overcoat layer 25. The second electrode 23 is formed on the upper surface of the first light shielding part 68 of the first embodiment.

The material of the first light shielding part 68 may be a resin material or a metal material, as long as the material can provide higher attenuation of light in the visible light region (with a wavelength from 380 nm to 780 nm) passing through the first light shielding part 68 than that can be provided by any of the filter films 26R, 26B, and 26G.

If the first light shielding part 68 is made of a resin material, a single layer of the first light shielding part 68 can increase the attenuation of light in the visible light region (with a wavelength from 380 nm to 780 nm) passing through the first light shielding part 68, and thus can enhance contrast with the filter films 26R, 26B, and 26G. According to the present embodiment, the second electrode 23, the insulating film 24, and the first alignment film 28 are interposed between the first light shielding part 68 and the liquid crystal layer 40, so that components of the resin material of the first light shielding part 68 are difficult to elute into the liquid crystal layer 40.

If the first light shielding part 68 is made of a conductive metal material, the material of the first light shielding part 68 is preferably a metal material, such as aluminum, copper, nickel, and chromium, or a derivative thereof, and preferably has a higher electrical conductivity than that of the second electrode 23. In this case, the first light shielding part 68 is preferably in direct contact with the second electrode 23. When the first light shielding part 68 is electrically coupled to the second electrode 23 as described above, the resistance per unit area between the second electrode 23 and the first light shielding part 68 is reduced, so that the bias in the common potential in a display plane is reduced. In this manner, the first light shielding part 68 serves as auxiliary wiring for supplying the common potential.

As illustrated in FIG. 6, a width 68W of the first light shielding part 68 is equal to or larger than a width 66W of the video signal line 66 in the width direction. When the width 68W of the first light shielding part 68 is larger than the width 66W of the video signal line 66 in the width direction, the first light shielding part 68 can overlap the video signal line 66 in the plan view, even in consideration of a production process margin (production error) of the video signal line 66. Reflected light from the video signal line 66 can be reduced with higher accuracy by setting the width 68W of the first light shielding part 68 to a value obtained by adding approximately twice the production error in the second direction of the video signal line 66 to the width 66W of the video signal line 66.

Figure 7:
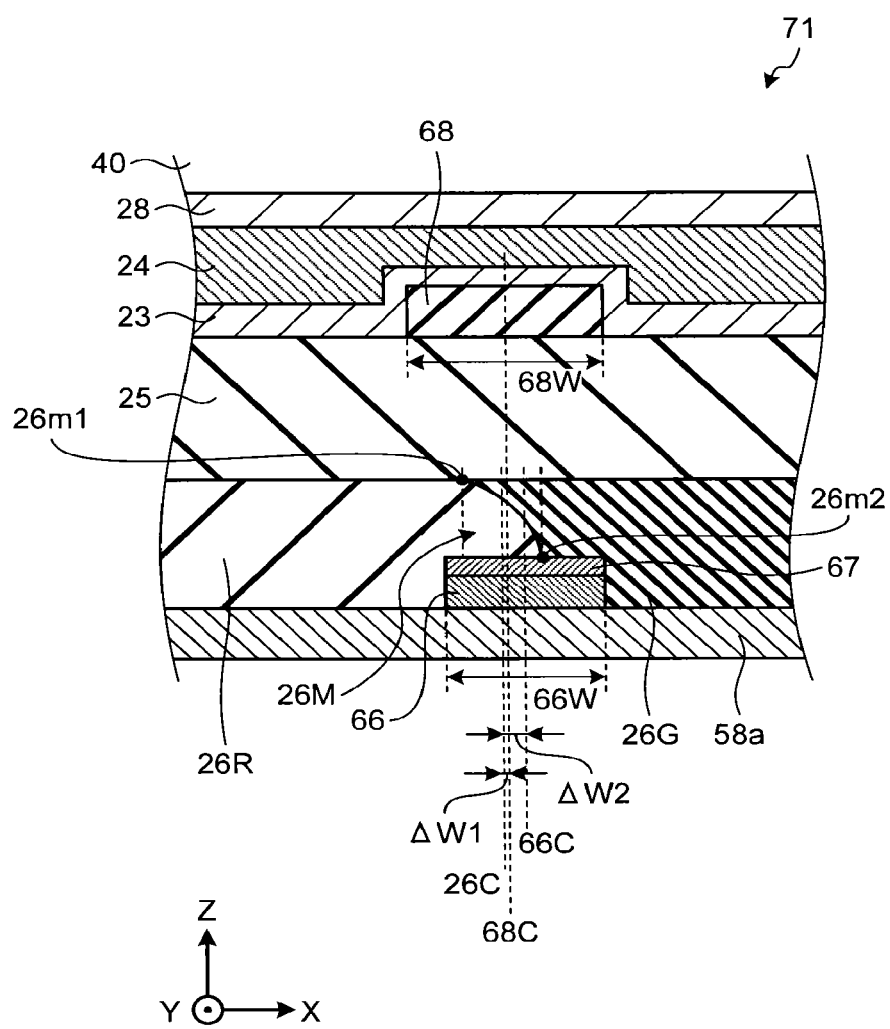
FIG. 7 is a sectional view obtained by partially enlarging another example of the filter boundary part illustrated in FIG. 5.

In the filter boundary part 71 illustrated in FIG. 6, a center 68C in the width direction of the first light shielding part 68 is preferably aligned with a center 66C in the width direction of the video signal line 66. FIG. 7 is a sectional view obtained by partially enlarging another example of the filter boundary part illustrated in FIG. 5. As illustrated in FIG. 7, in the filter boundary part 71, even if the center 68C in the width direction of the first light shielding part 68 is not aligned with the center 66C in the width direction of the video signal line 66, the first light shielding part 68 only needs to overlap the video signal line 66.

In the vicinity of the filter boundary part 71, light passing through a filter film (such as the filter film 26R) is easily mixed with light passing through an adjacent filter film (such as the filter film 26G). This color mixture is particularly noticeable when the COA structure is employed. Therefore, the color mixture described above is reduced by providing the first light shielding parts 68 between the first electrodes 22 and the filter films 26 so as to reduce the distance between the first light shielding part 68 and the filter films 26.

As illustrated in FIG. 7, an end of the filter film 26R and an end of the filter film 26G have an overlapping part 26M formed by overlapping the ends. As illustrated in FIG. 7, the overlapping part 26M also overlaps the video signal line 66. In FIG. 7, a middle position in the second direction between a boundary 26m1 and a boundary 26m2 is defined as a center 26C of the overlapping part 26M. In FIG. 7, the center 26C in the second direction of the overlapping part 26M differs from the center 66C in the second direction of the video signal line 66. In this case, a distance ΔW1 between the center 68C in the second direction of the first light shielding part 68 and the center 26C described above is preferably smaller than a distance ΔW2 between the center 66C and the center 26C, in the plan view. With this configuration, the first light shielding part 68 at least overlaps the overlapping part 26M even if it does not overlap the video signal line 66 in the plan view. As a result, the first light shielding part 68 only needs to have the width 68W for reducing the color mixture between the light passing through the filter film 26R and the light passing through the filter film 26G.

In the plan view, the distance ΔW1 between the center 68C in the second direction of the first light shielding part 68 and the center 26C described above is set smaller than the distance ΔW2 between the center 66C and the center 26C, so that relative positions of the first light shielding part 68 and the video signal line 66 can be different from each other in different XZ planes in the first direction. For example, the first light shielding parts 68 extend in parallel with the first direction as a whole, as illustrated in FIG. 2, and the overlapping parts 26M illustrated in FIG. 7 also extend in parallel with the first direction. On the other hand, the video signal lines 66 form an angle with the first direction on a pixel-by-pixel basis, as illustrated in FIG. 3. As a result, the sub-pixels 61 are included in a plurality of domains in the display plane, so that color change with respect to orientation can be suppressed.

The video signal line 66 is made of a metal material having metallic luster, so that the video signal line 66 preferably has an antireflection layer 67 on the upper surface thereof, as illustrated in FIG. 7. The antireflection layer 67 can reduce the reflection of the visible light by the video signal line 66. The antireflection layer 67 may be made of either an organic material or an inorganic material (including a metal material), and is preferably made of a metal material. Examples of the metal material include elemental metals such as copper, molybdenum, nickel, and chromium, and alloys of these, and may include oxides and nitrides of metals. Examples of the material of the antireflection layer 67 may include Al—X—N(where X is, for example, Cu, Mo, Ni, or Cr). The material used for the antireflection layer 67 is not limited to the materials listed above. When the video signal line 66 has the antireflection layer 67 on the upper surface thereof, the first light shielding part 68 may only partially overlap the video signal line 66.

As illustrated in FIG. 2, the first light shielding parts 68 extend in the first direction along the respective boundaries among the filter films 26R, 26G, and 26B. As illustrated in FIGS. 5 and 6, the video signal lines 66 of the present embodiment are provided between the first substrate 50 and the filter films 26R, 26G, or 26B. This structure allows the first light shielding parts 68 to more greatly reduce the color mixture between light beams passing through adjacent ones of the filter films 26R, 26G, and 26B than do the video signal lines 66.

As illustrated in FIGS. 2 and 3, the first light shielding parts 68 intersect the second light shielding parts 48 in the plan view. The first light shielding parts 68 are provided to the first substrate 50 whereas the second light shielding parts 48 are formed on the second substrate 31. This structure causes the first light shielding parts 68 to three-dimensionally intersect the second light shielding parts 48 without being in contact therewith in the sectional view, as illustrated in FIGS. 4 and 5. In this structure, the first light shielding part 68 is positioned closer to the overlapping part 26M illustrated in FIG. 7 than the second light shielding part 48 is. As a result, the width 68W in the second direction of the first light shielding part 68 can be smaller than the length 48W in the first direction of the second light shielding part 48.

When an opening width WP is reduced in the second direction of the sub-pixel 61 as illustrated in FIG. 3, the resolution of the display device 1 is improved. For example, even in a high resolution display device in which each of the filter films 26R, 26G, and 26B has a length of 15 μm or smaller in the second direction, or the number of pixels per inch (ppi) is 500, the color mixture is suppressed by using the first light shielding parts 68 of the present embodiment. In such a high resolution display device, the number of the filter films 26 is large, thereby increasing the number of the first light shielding parts 68. As a result, the area of the first light shielding parts 68 is increased in a display area, leading to a reduction in aperture ratio. However, if the COA structure is employed and the first light shielding parts 68 are provided to the first substrate 50, there is no need to take account of production error at the time of bonding the first substrate 50 to the second substrate 31. Therefore, the width of the first light shielding part 68 can be reduced. As a result, even in a high resolution display device in which each of the filter films 26R, 26G, and 26B has a width of 8 μm to 15 μm in the second direction, the sub-pixel 61 can have the opening width WP of approximately 4 μm to 11 μm in the second direction. This is because, even if prevention of color mixture and production errors are taken into account, the present embodiment enables the width of the first light shielding part 68 to be approximately 4 μm.

Second Embodiment

Figure 8:
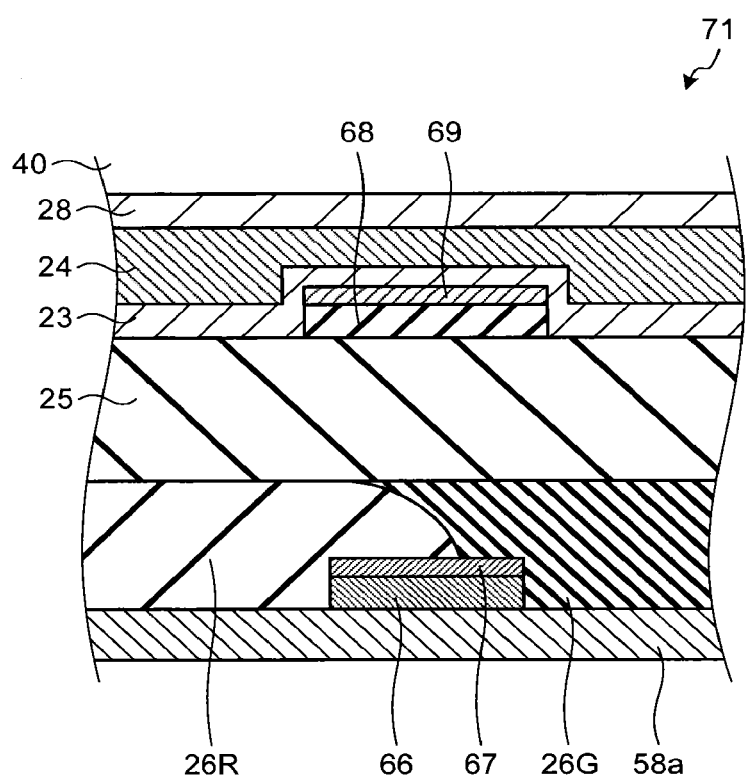
FIG. 8 is a sectional view obtained by partially enlarging the filter boundary part according to a second embodiment of the present invention.

FIG. 8 is a sectional view obtained by partially enlarging the filter boundary part according to a second embodiment of the present invention. If the first light shielding part 68 is made of a conductive metal material, the material of the first light shielding part 68 is preferably a metal material, such as aluminum, copper, nickel, and chromium, or a derivative thereof, and preferably has a higher electrical conductivity than that of the second electrode 23. This can achieve, in addition to a light shielding effect, lower resistance of the second electrode 23 in contact with the first light shielding part 68. If the first light shielding part 68 has metallic luster, the first light shielding part 68 preferably has an antireflection layer 69 on the upper surface thereof. The antireflection layer 69 can reduce the reflection of the visible light by the first light shielding part 68. The same material as that of the antireflection layer 67 described above can be used as the material of the antireflection layer 69.

Third Embodiment

Figure 9:
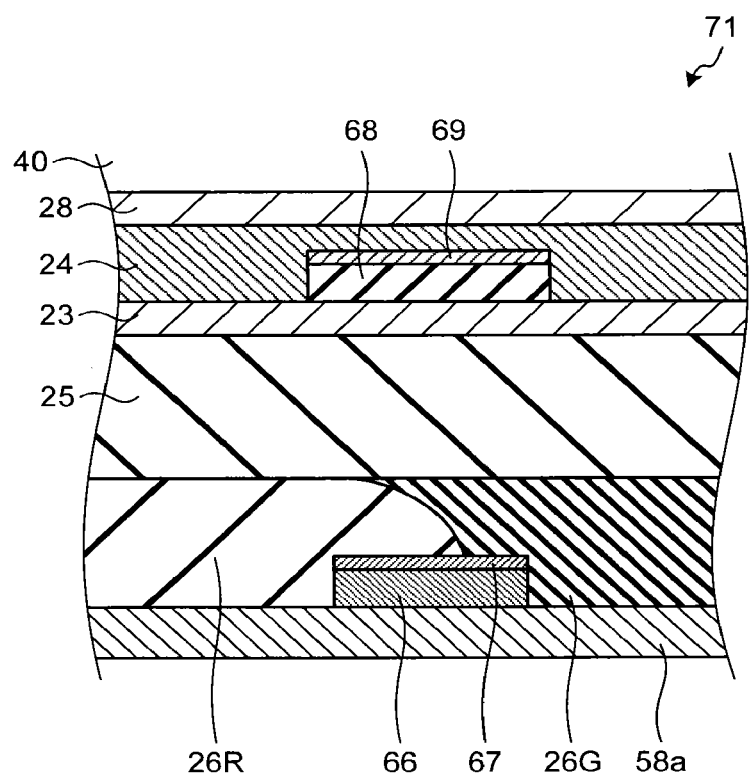
FIG. 9 is a sectional view obtained by partially enlarging the filter boundary part according to a third embodiment of the present invention.

FIG. 9 is a sectional view obtained by partially enlarging the filter boundary part according to a third embodiment of the present invention. In the filter boundary part 71 of the third embodiment, the first light shielding part 68 is provided on the upper surface of the second electrode 23. The first light shielding part 68 is provided between the layer in which the first electrodes 22 are provided and the layer in which the second electrode 23 is provided. If the first light shielding part 68 is made of a conductive metal material, the resistance of the second electrode 23 can be reduced in the same manner as described above. In addition, the first light shielding part 68 can be directly coupled to the second electrode 23, so that the antireflection layer 69 that has higher resistance than that of the first light shielding part 68 can be employed in the third embodiment.

If the first light shielding part 68 is made of a resin material, the antireflection layer 69 is unnecessary. In this case, the insulating film 24 and the first alignment film 28 are interposed between the first light shielding part 68 and the liquid crystal layer 40, so that the components of the resin material of the first light shielding part 68 are difficult to elute into the liquid crystal layer 40.

Fourth Embodiment

Figure 10:
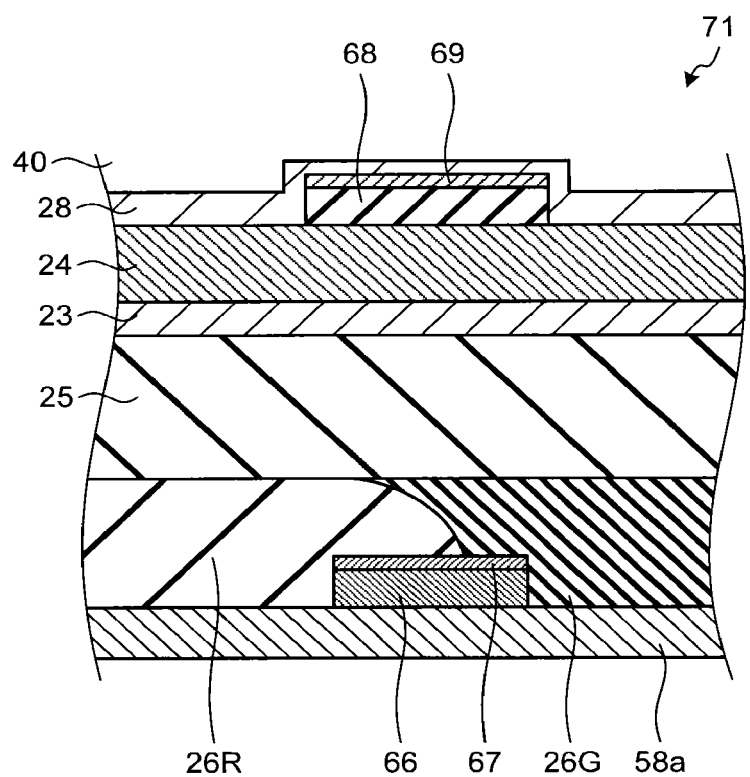
FIG. 10 is a sectional view obtained by partially enlarging the filter boundary part according to a fourth embodiment of the present invention.

FIG. 10 is a sectional view obtained by partially enlarging the filter boundary part according to a fourth embodiment of the present invention. In the filter boundary part 71 of the fourth embodiment, the first light shielding part 68 is provided on the upper surface of the insulating film 24. In this structure, the first light shielding part 68 is preferably made of a metal material. Therefore, even though only the first alignment film 28 is interposed between the first light shielding part 68 and the liquid crystal layer 40, the first light shielding part 68 contains no resin material component, so that the liquid crystal layer 40 is prevented from being contaminated.

Fifth Embodiment

Figure 11:
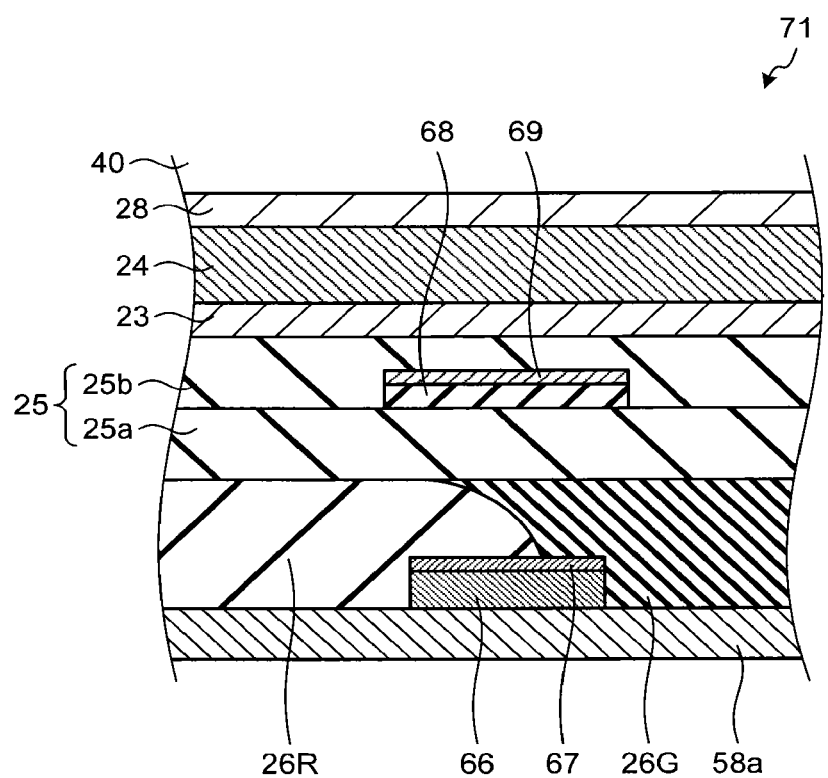
FIG. 11 is a sectional view obtained by partially enlarging the filter boundary part according to a fifth embodiment of the present invention.

FIG. 11 is a sectional view obtained by partially enlarging the filter boundary part according to a fifth embodiment of the present invention. In the filter boundary part 71 of the fifth embodiment, the overcoat layer 25 has of a plurality of layers, e.g., a first overcoat layer 25a and a second overcoat layer 25b. The first light shielding part 68 is provided on the upper surface of the first overcoat layer 25a. This structure eliminates the problem of contamination, so that the first light shielding part 68 may be made of either a resin material or a metal material. The first light shielding part 68 is embedded in the overcoat layer 25, so that the second electrode 23, the insulating film 24, and the first alignment film 28 provided above the overcoat layer 25 can be formed in a flatter manner.

Sixth Embodiment

Figure 12:
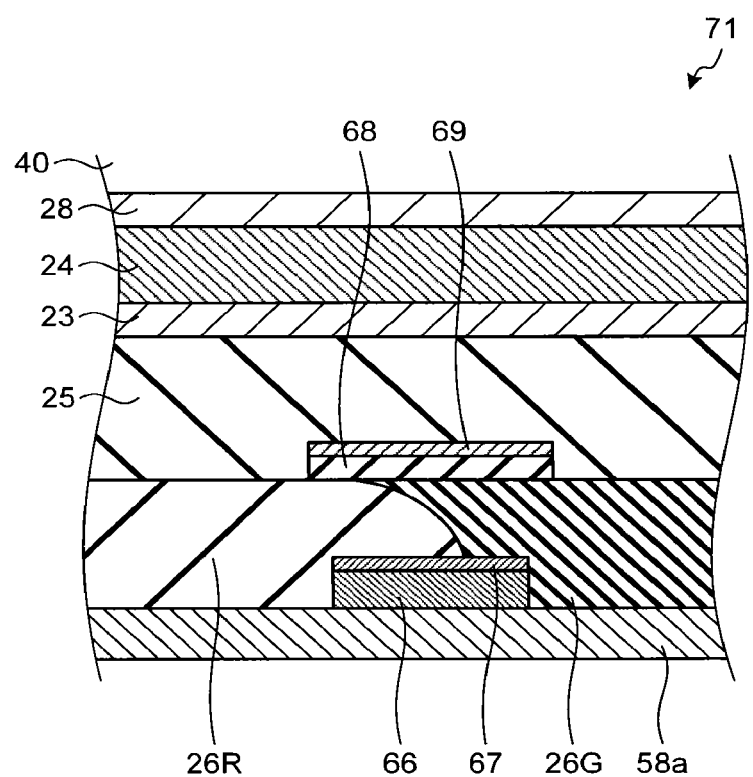
FIG. 12 is a sectional view obtained by partially enlarging the filter boundary part according to a sixth embodiment of the present invention.

FIG. 12 is a sectional view obtained by partially enlarging the filter boundary part according to a sixth embodiment of the present invention. In the filter boundary part 71 of the sixth embodiment, the first light shielding part 68 is provided on the upper surface of the boundary between the filter films 26R and 26G (above-described overlapping part 26M, refer to FIG. 7) so as to be in contact with the upper surface. When the first light shielding part 68 is made of a metal material, forming accuracy can be increased. Therefore, the first light shielding part 68 of a metal material can overlap the boundary between the filter films 26R and 26G. If the first electrode 22 overlaps the video signal line 66, the first light shielding part 68 is preferably made of a metal material. As a result, the resistance of the first electrode 22 can be reduced by bringing the first light shielding part 68 in contact with the first electrode 22.

Figure 13:
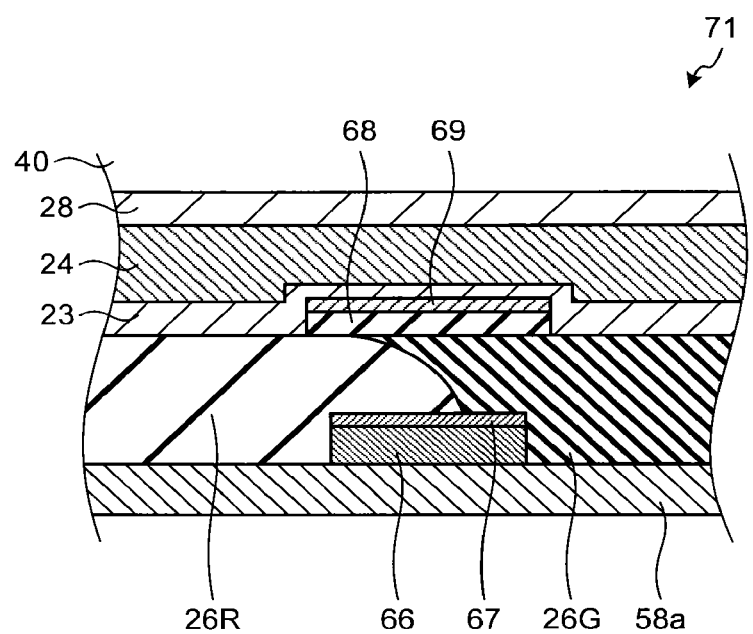
FIG. 13 is a sectional view obtained by partially enlarging the filter boundary part according to a modification of the sixth embodiment.

FIG. 13 is a sectional view obtained by partially enlarging the filter boundary part according to a modification of the sixth embodiment. In the filter boundary part 71 of the modification of the sixth embodiment, the first light shielding parts 68 are made of a metal material, so that the overcoat layer 25 is not formed as a film between the filter films 26 and the first light shielding parts 68. This structure reduces the number of processes, thereby reducing the production cost.

While the preferred embodiments of the present invention have been described above, the present invention is not limited thereto. The description disclosed in the embodiments is merely an example, and various modifications can be made without departing from the gist of the present invention. Appropriate modifications made without departing from the gist of the present invention also naturally belong to the technical scope of the present invention.

Figure 14:
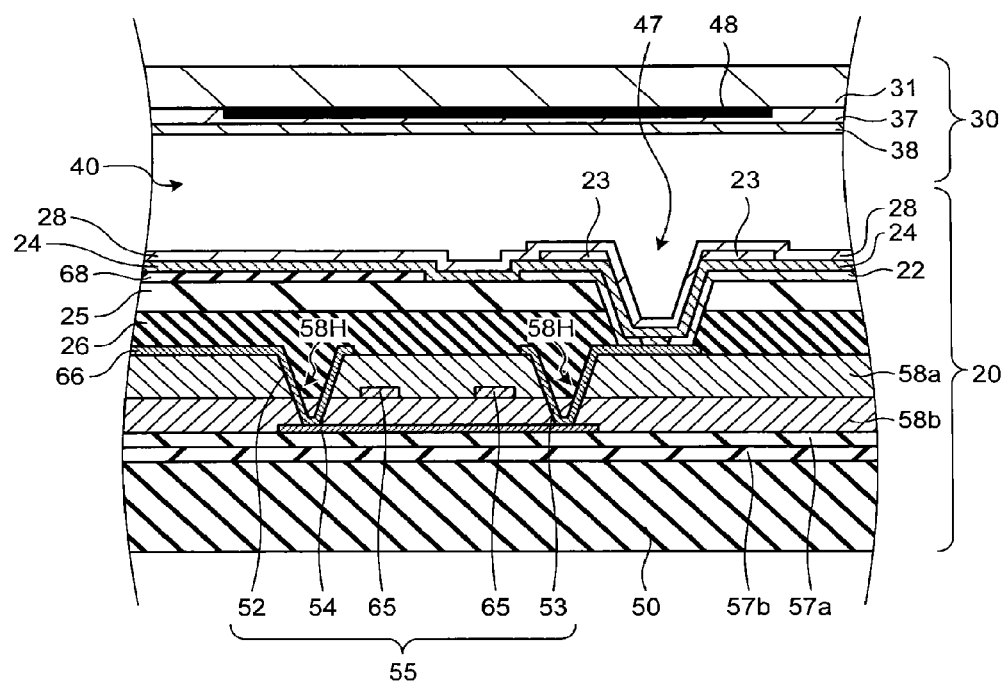
FIG. 14 is a sectional view schematically illustrating a first modification of the cross-section taken along line IV-IV' in FIG. 3.
Figure 15:
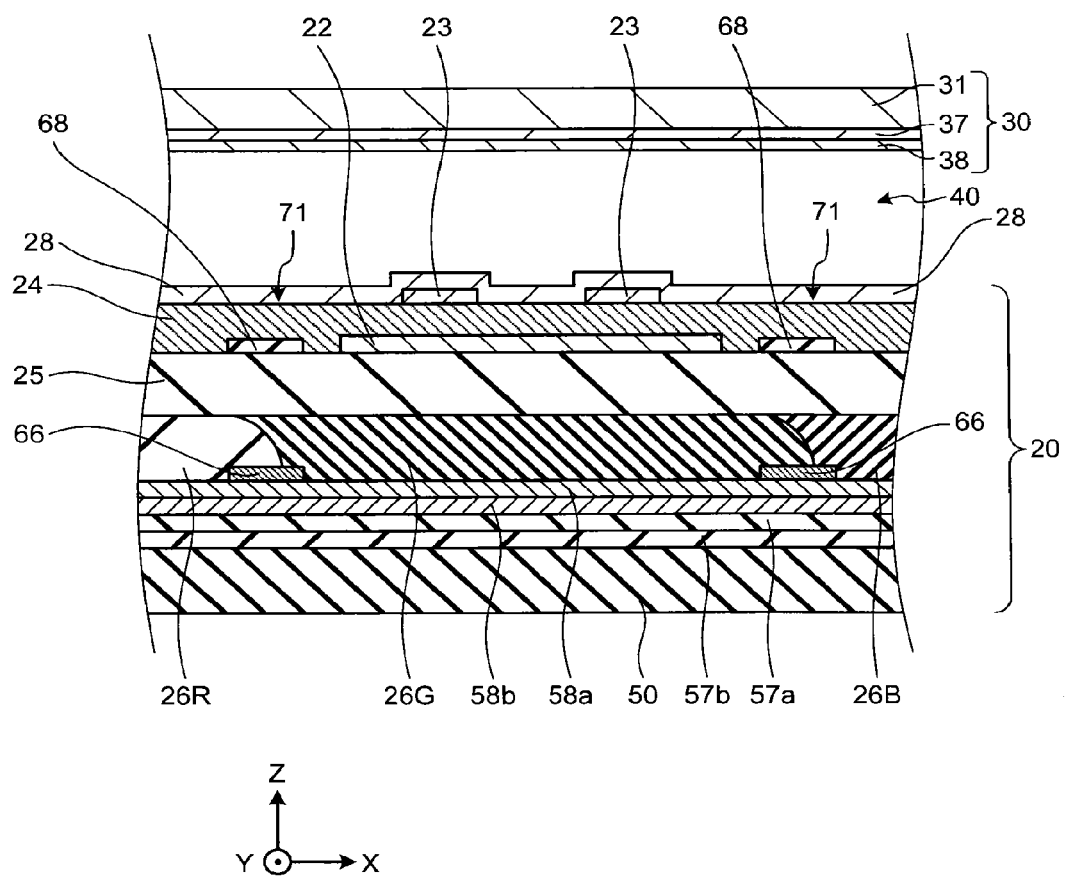
FIG. 15 is a sectional view schematically illustrating the first modification of the cross-section taken along line V-V' in FIG. 3.

For example, the present embodiments can be applied as the following first or second modification. FIG. 14 is a sectional view schematically illustrating the first modification of the cross-section taken along line IV-IV' in FIG. 3. FIG. 15 is a sectional view schematically illustrating the first modification of the cross-section taken along line V-V' in FIG. 3. In the first modification, the second electrode 23 illustrated in FIGS. 14 and 15 is what is called a common electrode to which the common potential is applied. The first electrode 22 is the pixel electrode to which the potential corresponding to the video signal is applied via the switching element 55 electrically coupled thereto. The second electrode 23 lies above the first electrode 22 with the insulating film 24 interposed therebetween. This structure causes a change in the potential between the first electrode 22 and the second electrode 23, thereby changing the electric field applied to the liquid crystal layer 40.

The second electrode 23 illustrated in FIG. 15 is isolated from the first light shielding part 68 by the insulating film 24. The second electrode 23 may be provided so as to be in direct contact with the first light shielding part 68. In this case, the first light shielding part 68 is preferably made of a metal material to reduce the resistance of the second electrode 23.

The present embodiments can be applied to liquid crystal display devices that operate in a fringe field switching (FFS) mode or in-plane switching (IPS) mode in which a transverse electric field between the first electrode 22 and the second electrode 23 is applied to the liquid crystal layer 40. The present invention is not limited to this mode, but can be applied to liquid crystal display devices of a vertical electric field type. The liquid crystal display devices of the vertical electric field type operate, for example, in a twisted nematic (TN) mode, vertical alignment (VA) mode, or electrically controlled birefringence (ECB) mode in which a vertical electric field between the first electrode 22 and the second electrode 23 is applied to the liquid crystal layer 40, as illustrated in FIG. 16.

Figure 16:
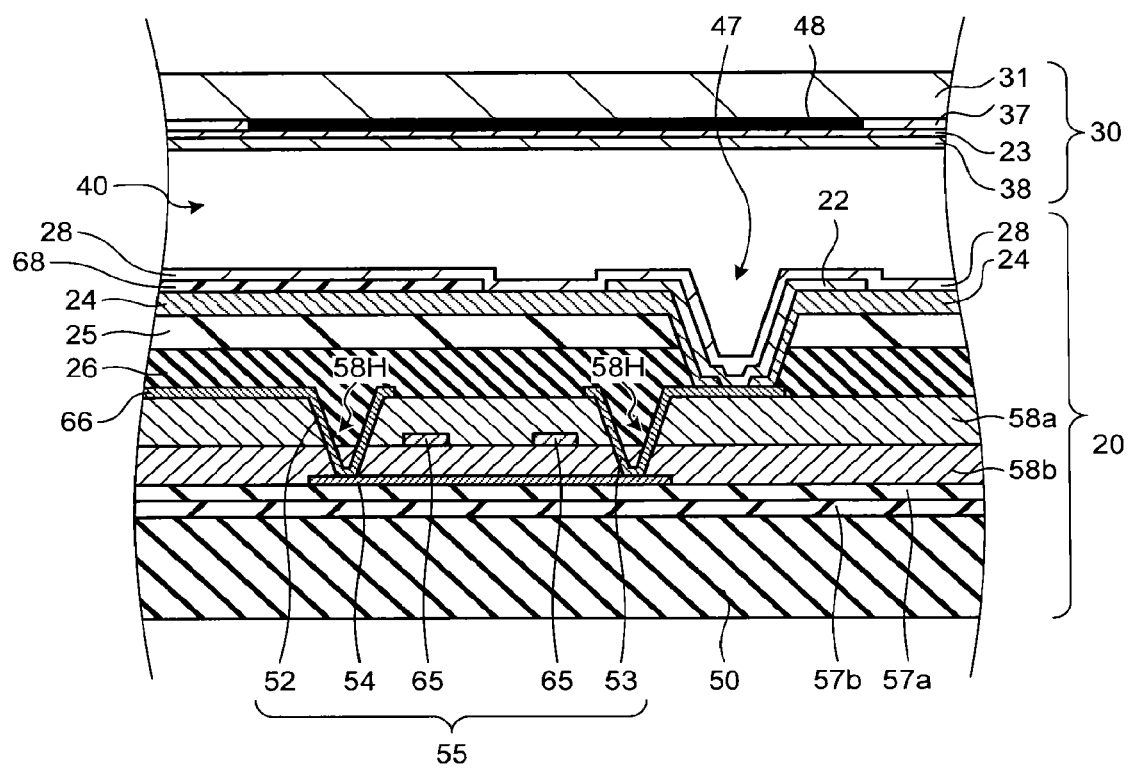
FIG. 16 is a sectional view schematically illustrating a second modification of the cross-section taken along line IV-IV' in FIG. 3.

FIG. 16 is a sectional view schematically illustrating the second modification of the cross-section taken along line IV-IV' in FIG. 3. The second electrode 23 illustrated in FIG. 16 is what is called a common electrode to which the common potential is applied. The first electrode 22 is the pixel electrode to which the potential corresponding to the video signal is applied via the switching element 55 electrically coupled thereto. As illustrated in FIG. 16, the second electrode 23 is provided not in the array substrate 20, but on the array substrate 20 side of the counter substrate 30. The vertical electric field between the first electrode 22 and the second electrode 23 is applied to the liquid crystal layer 40. The first electrode 22 illustrated in FIG. 16 is isolated from the first light shielding part 68 by the insulating film 24. The first electrode 22 may be provided so as to be in direct contact with the first light shielding part 68.

In the second modification, the first light shielding part 68 is preferably made of a metal material. The second modification reduces the number of processes and thus the production cost by employing a mode in which the first light shielding part 68 is provided on the upper surface of the insulating film 24 or a mode in which the first light shielding part 68 is provided on the upper surface of the boundary between the filter films 26R and 26G (above-described overlapping part 26M, refer to FIG. 7). The resistance of the first electrode 22 can be reduced by bringing the first light shielding part 68 in contact with the first electrode 22.

While the display device of the present embodiments has been described as the liquid crystal display device, the embodiments can also be applied to display devices that light self-light-emitting elements, such as organic light-emitting diodes (OLEDs).

The embodiments described above can be combined as appropriate with one another. For example, the structure of the display device may be such that the first light shielding part 68 illustrated in FIG. 7 is provided under the second electrode 23 and the first light shielding part 68 illustrated in FIG. 9 is provided on the upper surface of the second electrode 23 so that the second electrode 23 is interposed between the upper and the lower first light shielding parts 68. This structure allows the first light shielding parts 68 to have higher contrast with the filter films 26R, 26B, and 26G.

What is claimed is:

1. A display device comprising:
a first substrate including a switching element; and
a second substrate provided at a position facing the first substrate, wherein
the first substrate comprising:
a scanning line that drives the switching element;
a video signal line electrically coupled to the switching element;
a first electrode electrically coupled to the switching element via a metal electrode;
a filter film including a first filter film and a second filter film that has a visible-light wavelength distribution different from that of the first filter film;
a first light shielding part provided between the filter film and the first electrode; and
a second light shielding part provided on the second substrate,
the first filter film and the second filter film each have long sides that extend in a first direction in which the video signal line extends, and the first filter film and the second filter film are arranged adjacent to each other in a second direction different from the first direction,
the first light shielding part overlaps the video signal line in a plan view, and
the second light shielding part overlaps the metal electrode in the plan view.

2. The display device according to claim 1, wherein the first filter film or the second filter film has a length of 15 μm or smaller in the second direction.

3. The display device according to claim 2, wherein
an end of the first filter film and an end of the second filter film have an overlapping part where the end of the first filter film overlaps the end of the second filter film,
the overlapping part overlaps the video signal line,
a first center in the second direction of the overlapping part differs from a second center in the second direction of the video signal line corresponding to the overlapping part, and
a distance between a third center in the second direction of the first light shielding part and the first center is smaller than a distance between the third center and the second center, in the plan view.

4. The display device according to claim 2, wherein the video signal line is provided between the first substrate and the filter film.

5. The display device according to claim 2, wherein the second light shielding part overlaps the scanning line or the switching element in the plan view.

6. The display device according to claim 2, wherein the first light shielding part is made of a metal material, and is in contact with the first electrode or the filter film.

7. The display device according to claim 1, wherein
an end of the first filter film and an end of the second filter film have an overlapping part where the end of the first filter film overlaps the end of the second filter film,
the overlapping part overlaps the video signal line,
a first center in the second direction of the overlapping part differs from a second center in the second direction of the video signal line corresponding to the overlapping part, and
a distance between a third center in the second direction of the first light shielding part and the first center is smaller than a distance between the third center and the second center, in the plan view.

8. The display device according to claim 7, wherein the video signal line is provided between the first substrate and the filter film.

9. The display device according to claim 7, wherein the second light shielding part overlaps the scanning line or the switching element in the plan view.

10. The display device according to claim 7, wherein the first light shielding part is made of a metal material, and is in contact with the first electrode or the filter film.

11. The display device according to claim 1, wherein the video signal line is provided between the first substrate and the filter film.

12. The display device according to claim 11, wherein the second light shielding part overlaps the scanning line or the switching element in the plan view.

13. The display device according to claim 11, wherein the first light shielding part is made of a metal material, and is in contact with the first electrode or the filter film.

14. The display device according to claim 1, wherein the second light shielding part overlaps the scanning line or the switching element in the plan view.

15. The display device according to claim 1, wherein the first light shielding part is made of a metal material, and is in contact with the first electrode or the filter film.

16. The display device according to claim 1, wherein
the first substrate further comprises a second electrode that faces the first electrode, and to which a common potential is applied, and
the first light shielding part is made of a metal material, and is in contact with the second electrode.

17. The display device according to claim 1, wherein the first light shielding part is made of a metal material, and is each provided, on a surface thereof, with an antireflection layer.

18. The display device according to claim 1, wherein
the first substrate further comprises a second electrode that faces the first electrode, and to which a common potential is applied, and
the first light shielding part is provided between the first electrode and the second electrode.

19. The display device according to claim 1, wherein the second light shielding part is made of a resin material.

20. The display device according to claim 19, wherein the second substrate has a first surface on which the second light shielding part is provided, and a second surface that is provided at an opposite side to the first surface, and on which a detection electrode configured to detect contact or proximity of an object is provided.

* * * * *